United States Patent [19]
Nishimura et al.

[11] Patent Number: 5,788,898
[45] Date of Patent: Aug. 4, 1998

[54] PROCESS OF MAKING POLYPROPYLENE HEAT SHRINKABLE FILM

[75] Inventors: Masayuki Nishimura; Kiyoshi Sogabe; Hiroyuki Tanaka; Shinji Arai, all of Moriyama, Japan

[73] Assignee: Gunze Limited, Ayabe, Japan

[21] Appl. No.: 922,331

[22] Filed: Sep. 3, 1997

Related U.S. Application Data

[62] Division of Ser. No. 712,675, Sep. 13, 1996, Pat. No. 5,702,784, which is a continuation of Ser. No. 297,859, Aug. 30, 1994, abandoned.

[30] Foreign Application Priority Data

Sep. 3, 1993 [JP] Japan ............................ 5-220083

[51] Int. Cl.$^6$ .......................... B29C 55/16; B65B 51/10
[52] U.S. Cl. .......................... 264/290.2; 53/450; 53/476; 53/477
[58] Field of Search .......................... 264/290.2; 53/450, 53/476, 477

[56] References Cited

U.S. PATENT DOCUMENTS

| | | |
|---|---|---|
| 4,343,852 | 8/1982 | Isaka et al. ............. 264/290.2 X |
| 4,894,421 | 1/1990 | Kioka et al. . |
| 5,219,002 | 6/1993 | Stenger et al. . |
| 5,266,641 | 11/1993 | Asanuma et al. . |

FOREIGN PATENT DOCUMENTS

| | | |
|---|---|---|
| 53-36 | 1/1978 | Japan . |
| 56-39350 | 9/1981 | Japan . |
| 62-33251 | 7/1987 | Japan . |
| 63-7933 | 2/1988 | Japan . |
| 3-212434 | 9/1991 | Japan . |

*Primary Examiner*—Leo B. Tentoni
*Attorney, Agent, or Firm*—Oblon, Spivak, McClelland, Maier & Neustadt, P.C.

[57] ABSTRACT

The heat shrinkable film includes at least one of an ethylene-propylene random copolymer and an ethylene-propylene-butene random copolymer and a propylene-butene copolymer of low crystallinity, which is biaxially stretched simultaneously by a ratio of 2.0–3.5 times for each of the machine direction and the transverse direction by a wet heating method. The film preferably has a tensile elongation at breaking of more than 200%, and a heat shrinking ratio of more than 8% for each of the machine direction and the transverse direction when it is immersed in glycerine at 80° C. for 30 sec. Since the film is excellent in tensile elongation and has satisfactory heat shrinkability at low temperature, it is suitable as a film for use in an automatic L-bar sealer in which a tensile elongation at breaking is an important factor.

12 Claims, 3 Drawing Sheets

PROCESS OF MAKING POLYPROPYLENE HEAT SHRINKABLE FILM

This application is a division of application Ser. No. 08/712,675 filed Sept. 13,1996 now U.S. Pat. No. 5,702,784, which is a continuation of application Ser. No. 08/297,859, filed Aug. 30, 1994, now abandoned.

BACKGROUND OF THE INVENTION

1. Field of the Invention

The present invention concerns a polyolefine heat shrinkable film, in particular a polypropylene heat shrinkable film, which is easy to elongate and excellent in shrinkability at low temperature.

2. Description of the Prior Art

Polyolefine heat shrinkable films, in particular, heat shrinkable films mainly comprising propylene copolymer (hereinafter referred to as "polypropylene heat shrinkable films) have been used generally as heat shrinkable films in the field of packaging. Since they are prepared from starting materials mainly of polypropylene or ethylene-propylene copolymer and, in addition, subjected to biaxial stretching by a so-called dry heating method such as infrared heating or hot blow heating, they inevitably tend to lack in the tensile elongation at breaking and are poor in the heat shrinkability at low temperature. Particularly, lack of the tensile elongation at breaking results in the following problems upon packaging by using an automatic L-bar sealer or the like.

Description will at first be made to a machine for automatically packaging by melting and cutting a film in a L-shaped sealer (hereinafter referred to as an "automatic L-bar sealer") and a method of packaging by using the automatic L-bar sealer (hereinafter referred to as a "method of melting-cutting packaging method") with reference to FIG. 1 and FIG. 2. The automatic L-bar sealer is adapted, as shown in FIG. 1, to load an article to be packaged 3 (hereinafter referred to as an "article 3") in a folded heat shrinkable film 2 (fold being shown at 7) drawn out of a roll body 1, apply L-shaped sealing and melt-cutting successively by an L-shaped sealer 4, to obtain a packaged body 10 as shown in FIG. 3. In the packaged body shown in FIG. 3, reference numeral 7 denotes folded portions, 5, 5' and 6 denotes melt-cut and sealed portion. FIG. 3 shows a state before applying a heat shrinking step. The heat shrinkable film 2 containing the article 3 therein is caused to be shrunk at the heat shrinking step so as to form the packaged body 10. In FIGS. 1 through 3, the melting-cutting sealed portions 5, 5', 6 are shown as having a large width for the sake of convenience but the width may be as narrow as a substantially linear shape.

The step for applying the melting-cutting seal comprises Step I of placing an article 3 into a film 2 and Step II of applying melting-cutting seal as schematically shown in FIG. 2. A first conveyor 11 conveys the article 3 such that it is contained in the film in Step I, while a second conveyor 12 conveys the article 3 contained in the film 2 to Step II and, further, conveys a formed packaged body 10.

Referring more specifically to the automatic L-bar sealer, the film 2 drawn out of the roll body 1 is reversed such that the surface and the rear face are turned upside down by a pair of upper and lower trigonal guide members 13 and turned such that the advancing direction is in perpendicular to the drawing direction. In this instance, an opening portion 14 of the film 2 is opened by the pair of upper and lower trigonal guide members 13. Further, the top end of the film 2 in the advancing direction is a portion which was melt-cut and sealed upon previous formation of the packaged body 10 and the portion constitutes a melting-cutting seal portion 5'. On the other hand, the article 3 is conveyed by the first conveyor 11 disposed in perpendicular to the drawing direction of the film 2, and the article 3 passes through between the trigonal guide member 13a on the upper side and the trigonal guide member 13b on the lower side, enters from the opening portion 14 into the film 2 and is halted in the proximity of the seal portion 5' and advances to Step II.

A pair of upper and lower chains 15, 15 transfer the film 2 by seizing a side opening portion 14 from Step I to Step II.

A seal member 16 is disposed above the second conveyor 12. An L-shaped sealer 4 is attached to the bottom surface of the seal member 16 for applying L-shaped melting-cutting seal to the opening portion 14 of the film 2. When the film 2 containing the article 3 therein is sealed and weld-cut at the melting-cutting lines 5, 6 by the L-shaped sealer 4, the melting-cutting lines 5, 6 are served as melting-cutting seal portions 5, 6 to form a packaged body 10. The melting-cutting seal portion on the side of the film 2 cut out at the melting-cutting seal portion 5 is depicted at 5'. The packaged body 10 is packaged by sealing opening portions at the melting-cutting seal portion 5, 6 and the folded portion 7 of the film 2 formed in Step II, and the melting-cutting seal portion 5' formed upon previous formation of the packaged body 10. Upon forming the melting-cutting seal portion 6, a cut end, a so-called lug 20 of the film is caused. Upon conducting L-shaped melting-cutting seal successively, lugs 20 formed continuously are transferred successively together with the film 2 by means of a pair of chains 15, 15 and applied with trimming.

As described above, since Step I and Step II are conducted successively and continuously in the packaging by using the automatic L-bar sealer, the film 2 has to be pulled by a proper tension by the chain 15 upon drawing and transportation from Step I to Step II. However, if the film 2 or the lug 20 is broken by the tension upon pulling, continuous operation is interrupted. Accordingly, it is required for the film to have such a physical property as not to be broken due to the tension upon automatic packaging, that is, tensile elongation. Further, upon trimming for the lug 20, it is desired for the film 2 that it has a soft feeling in order that the trimmed portion less suffers from breaking.

SUMMARY OF THE INVENTION

It is an object of the present invention to provide a heat shrinkable film having a high tensile elongation at breaking as well as satisfactory heat shrinkability at low temperature and suitable to various kinds of packaging apparatus including an automatic L-bar sealer.

The present inventor et al. at first have taken a notice on a propylene-butene copolymer of low crystallinity as a polymer constituting the heat shrinkable film, and on a biaxial stretching method by a so-called wet heating system such as a hot water heating method or the like. Then, as a result of studies on various kinds of polymers and stretching methods, the present invention has been accomplished.

Specifically, a heat shrinkable polypropylene film according to the present invention comprises at least one or both of an ethylene-propylene random copolymer and an ethylene-propylene-butene random copolymer, and a propylene-butene copolymer of low crystallinity and is stretched each by 2.0 to 3.5 times both for the machine direction and the transverse direction simultaneously by a wet heating method. The film of the present invention also includes a film biaxially stretched simultaneously into a tubular shape. As the ethylene-propylene random copolymer of the present invention, there can be mentioned specifically, for example, a copolymer having an ethylene content of 1 to 20 mol % and, preferably, 3 to 8 mol %, with no particular restriction.

As the ethylene-propylene-butene random copolymer, there can be mentioned, specifically, for example, a copolymer having an ethylene content of 0.5 to 10 mol % and, preferably, 1 to 6 mol %, and a butene content of 0.5 to 10 mol %, preferably, 1 to 6 mol %, with no particular restriction.

As the propylene-butene copolymer of low crystallinity, there can be mentioned, specifically, for example, a copolymer having a propylene content of 40 to 98 mol % and, preferably, 70 to 94 mol %, and a butene content of 60 to 2 mol %, preferably, 30 to 6 mol % and having a melt-index (MI) of 0.5 to 30 g/10 min, preferably, 2 to 10 g/10 min. In particular, the ethylene-propylene random copolymer can be mentioned as a preferred example for the heat shrinkable polypropylene film of the present invention.

The heat shrinkable polypropylene film of the present invention contains at least one of the ethylene-propylene random copolymer and the ethylene-propylene-butene random copolymer, and the propylene-butene copolymer of low crystallinity. The mixing ratio for both of them is, for example, from 1 to 95 parts by weight, preferably, 5 to 30 parts by weight of the latter based on 100 part of the former. If necessary, the heat shrinkable film according to the present invention may properly contain in addition to the polymers described above, other kinds of thermoplastic resins and additives such as slipping agent, antistatic agent, anti-clouding agent, UV-inhibitor, blocking inhibitor or the like.

The heat shrinkable film of the present invention is prepared by forming a not-stretched film from a blend comprising the foregoing composition and then applying biaxial stretching in the machine direction and the transverse direction simultaneously by a wet heating method.

Description will be made to the biaxial simultaneous stretching of the wet heating system.

At first, for the wet heating system, there can be mentioned a direct heating method by means of a so-called wet heating medium such as a heating liquid or heating steam. Specifically, there can be mentioned, for example, a method of spraying heating liquid; a method of dipping into a heating liquid, a method of passing through heating steams and a method of heating by passing through high temperature and high humidity atmosphere.

For stretching, a not-stretched tubular stock material is at first prepared from the blend described above. This results in the not-stretched tube in a state of folded flat. An apparatus as shown in FIG. 4 is generally used for the preparation of the not-stretched tubular stock material. Then, the not-stretched tubular stock material folded flat is stretched. Stretching is carried by use of an apparatus shown in FIG. 5 by blowing a gas from the side of a pinch roll 23 to inflate a tube 21 while supporting the tube between a pinch roll 22 and the pinch roll 23 rotated at different speeds and softening the tube by a heating liquid, for example, water jetted out from a stretching ring 24. Upon inflation, a control ring 25 controls the tube to a constant diameter and cools the tube by jetting out a coolant. The thus stretched tube 26 of the heat shrinkable film is made flat by a V-shaped collapser 27, drawn by the pinch roll 23 and taken-up to a winder 28. In this instance, preparation and stretching of the stock material may of course be applied successively. This is a preferred example of applying stretching but the present invention is not restricted only thereto.

As the heating liquid used for stretching, water at a temperature, for example, of 60° to 100° C., preferably, 80° to 98° C. is suitable but various kinds of other liquids than water such as glycerine may also be used.

The stretching ratio is from 2.0 to 3.5 times each for the machine direction (MD) and the transverse direction (TD). If the ratio is less than twice, the heat shrinkability is insufficient and spots due to uneven thickness are liable to be caused. On the other hand, if the ratio exceeds 3.5 times, it may possibly lead to a worry of tube breakage upon stretching or deterioration of tensile elongation at breaking.

In order to prevent spontaneous shrinking or the like, a heat treatment at low temperature may be applied if necessary after stretching and the treating temperature is for example about 40° to 60° C. There is no particular restriction on the thickness of the thus obtained film but it is generally, for example from 8 to 50 μm, preferably, 12 to 30 μm.

In addition, since the thus obtained shrinkable film is tubular, if the film is used for an automatic L-bar sealer or the like, the tube taken-up in a flat state may be cut on one side or at a central portion into a double-folded film, or cut to a an appropriate size into a flat film and the film may be used in an appropriate manner.

The tensile elongation at breaking of the heat shrinkable film according to the present invention thus obtained is usually about more than 200%, preferably, from 220 to 400% with no particular restriction. Further, the heat shrinking ratio of the heat shrinkable film according to the present invention is more than 8%, preferably, about 10 to 20% for each of machine direction and transverse direction when it is immersed in glycerine at 80° C. for 30 sec with no particular restriction. Generally, if a heat shrinkable film of a tensile elongation at breaking of less than 200% is used for packaging by using an automatic L-bar sealer, breakage or the like is caused to lug portions to be trimmed to remarkably hinder the operation efficiency. On the other hand, if the heat shrinkability is less than 8%, the heat-shrunk film cannot tightly fit the article 3. Accordingly, the heat shrinkable film according to the present invention is excellent in tensile elongation at breaking and satisfactory in heat shrinkability at low temperature, which is suitable to a film for use in an automatic L-bar sealer in which the tensile elongation at breaking is an important factor.

Further, among the heat shrinkable films according to the present invention, a film of relatively low toughness having a tensile modulus of elasticity about less than 95 kg/mm$^2$, particularly, from 60 to 90 kg/mm$^2$ is preferred. If it exceeds 95 kg/mm$^2$, the film tends to lack in softness and flexibility, so that breakage for trimmed lug portions 20 are liable to be induced when the film is used for the automatic L-bar sealer. However, in view of the adaptability of the machine or the like, it is still usable even if the tensile modulus of elasticity exceeds the above-mentioned range, and the heat shrinkable film according to the present invention undergoes no particular restriction by the above-mentioned range.

The heat shrinkable polypropylene film according to the present invention is particularly suitable to the automatic L-bar sealer but the application use is not restricted only thereto and the film can be used to various kinds of packaging films, as well as in all other fields.

DESCRIPTION OF THE PREFERRED EMBODIMENTS

Descriptions will now be made to the present invention based on specific embodiments but the invention is not restricted only to the following embodiments.

Example 1

Figure 1:
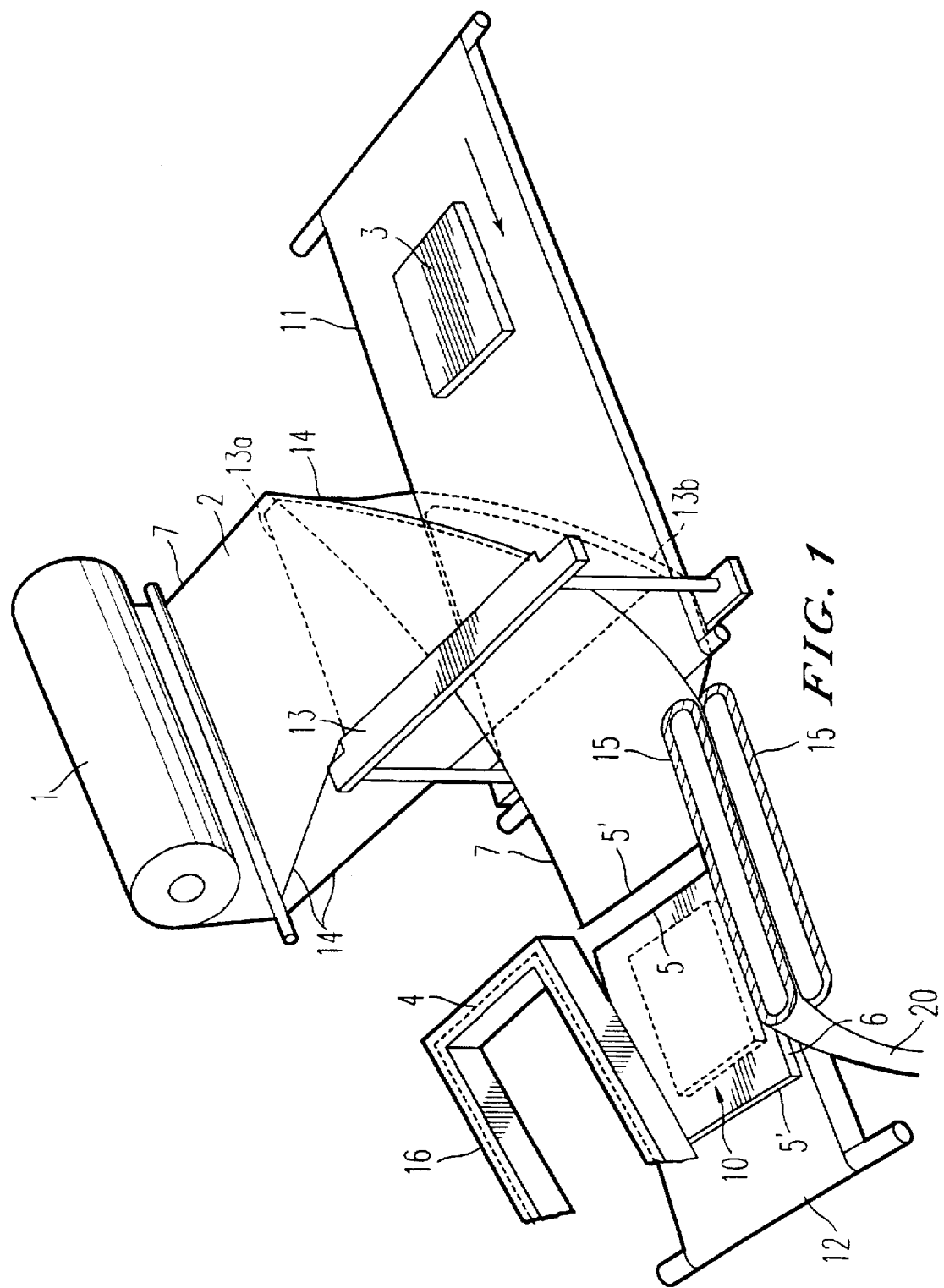
FIG. 1 is a view illustrating an automatic L-bar sealer and melting-cutting packaging using the sealer.
Figure 2:
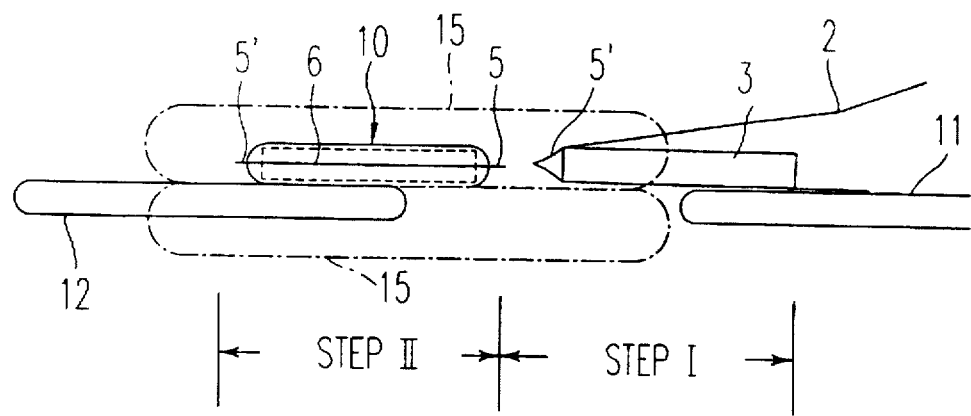
FIG. 2 is a view for explaining the outline of a melting-cutting packaging step using the automatic L-bar sealer.
Figure 3:
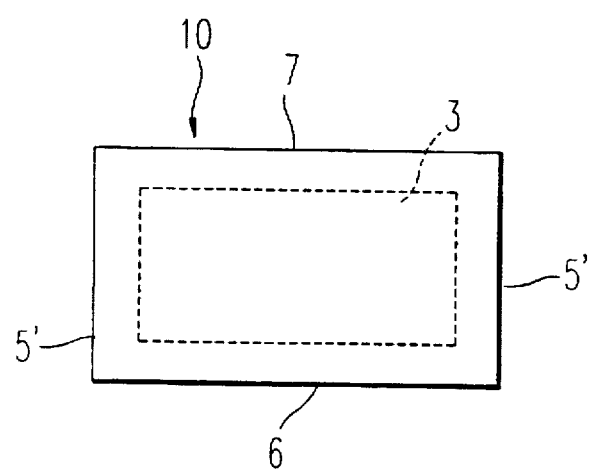
FIG. 3 is a view illustrating a packaged body packaged by melting-cutting by using the automatic L-bar sealer.
Figure 4:
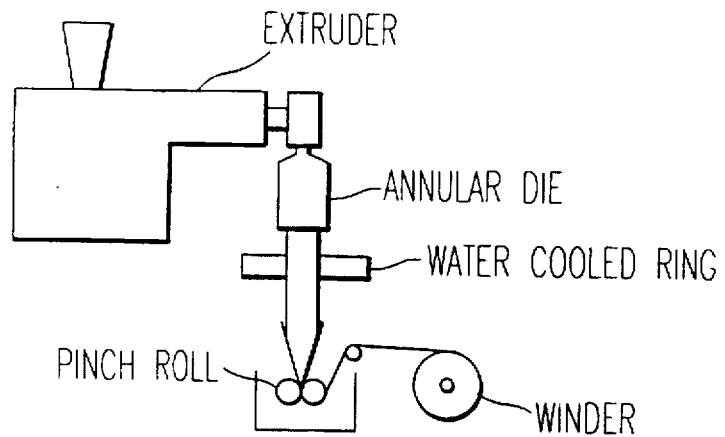
FIG. 4 is a view illustrating a manufacturing apparatus for a not-stretched tubular stock material.
Figure 5:
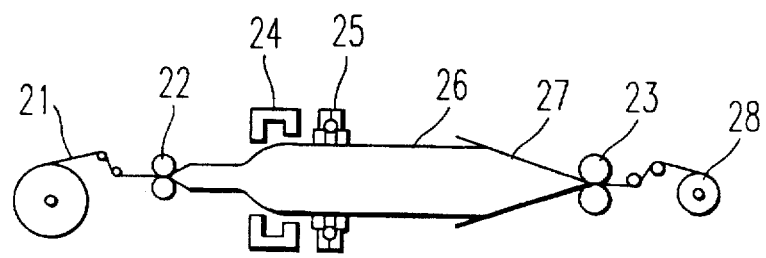
FIG. 5 is a view illustrating a wet heating type biaxially simultaneous stretching apparatus.

A raw material containing 100 parts by weight of an ethylene-propylene-butene random copolymer having an ethylene content of 3.0 mol % and a butene content of 1.8 mol % (MI: 6.5 g/10 min, melting point: 137° C., density: 0.9/cm$^3$), 25 parts by weight of a propylene-butene random copolymer of low crystallinity having a butene content of 16 mol % (MI: 7.0 g/10 min, density: 0.89 g/cm$^3$) and a small amount of an aliphatic acid amid type slip agent, silica type blocking inhibitor and an antistatic agent was formed into a film by using an extruder shown in FIG. 4 to obtain a not-stretched tubular stock material with 16 cm lay flat (see:"lay flat" is a dimension in a widthwise direction of a tube when flattened) and 125 μm thickness. The not-stretched tubular stock material is stretched by a biaxial simultaneous stretching machine of a hot water heating system as shown in FIG. 5 to obtain a heat shrinkable film of 40 cm lay flat and 20 μm thickness. The stretching ratio was 2.5 times for each of the machine direction (extruding direction: MD) and the transverse direction (direction perpendicular to the extruding direction: TD), the temperature of hot water jetted out from a stretching ring was 96° C., the temperature of cooling water flowing out of a control ring was at 25° C. and the stretching speed was at 80 m/min in a pinch roll at the downstream.

Characteristics of the thus obtained film and main test methods are shown in Table 1.

COMPARATIVE EXAMPLE 1

A raw material comprising only the ethylene-propylene-butene copolymer as that used in Example 1, not blended with the propylene-butene random copolymer of low crystallinity and incorporated with a small amount of a blocking inhibitor and an antistatic agent was extruded into a film by an inflation method, applied with biaxial simultaneous stretching by a dry heat heating system, to obtain a heat shrinkable film. The stretching ratio was 4.5 times in the machine direction and 4.5 times in the transverse direction, and the stretching temperature was about 110° C. as the film temperature.

Table 1 shows the characteristics of the resultant film.

COMPARATIVE EXAMPLE 2

A heat shrinkable film was obtained by using the same raw material as in Example 1 except for changing the blending amount of the propylene-butene random copolymer of low crystallinity to 18 parts by weight and forming it into a film followed by stretched in the same procedures as those in Comparative Example 1, to obtain a heat shrinkable film. The stretching ratio in this case was made identical with that in Comparative Example 1.

Table 1 also shows physical properties of the resultant heat shrinkable film.

TABLE 1

| Item | Unit | Example 1 Machine direction(MD) | Example 1 Transverse direction(TD) | Comparative Example 1 Machine direction(MD) | Comparative Example 1 Transverse direction(TD) | Comparative Example 2 Machine direction(MD) | Comparative Example 2 Transverse direction(TD) | Test method |
|---|---|---|---|---|---|---|---|---|
| Tensile break strength | kg/mm$^2$ | 10.6 | 10.7 | 15.9 | 13.6 | 16.3 | 13.3 | ASTM D-882 |
| Tensile elongation at breaking | % | 271 | 264 | 130 | 163 | 128 | 158 | |
| Heat shrinkage ratio | | | | | | | | |
| 70° C. | % | 6 | 7 | 2 | 3 | 4 | 3 | Immersed in |
| 80° C. | | 12 | 13 | 5 | 6 | 7 | 7 | glycerine for |
| 90° C. | | 19 | 21 | 8 | 11 | 12 | 13 | 30 sec |
| 100° C. | | 27 | 32 | 12 | 19 | 17 | 20 | |
| Tear load | g | 9.3 | 9.5 | 6.2 | 7.0 | 5.5 | 6.4 | ASTM D-1922 |
| Seal strength | | | | | | | | |
| 125° C. | kg/cm | 0.410 | | 0.035 | | 0.10 | | Heat seal tester |
| 130° C. | | 0.510 | | 0.138 | | 0.43 | | Time 1 sec Pressure 2 kg/cm$^2$ |
| Tensile modulus of elasticity | kg/mm$^2$ | 85 | 87 | 118 | 97 | 110 | 102 | ASTM D-882 |

As can be seen from Table 1, the film of Example 1 is excellent in the tensile elongation at breaking and, particularly, shows high heat shrinking ratio at low temperature. Further, when the heat shrinkable films obtained in the Examples and the Comparative Examples were applied to an automatic L-bar sealer and the automatic L-shaped melting-cutting packaging was attempted, trimming for lug portions was conducted smoothly causing no breakages in the film of Example 1. On the other hand, when the films of the Comparative Examples were applied to the automatic L-shaped melting-cutting packaging in the same manner, breakage was caused at the trimmed portion, so that operation of the machine has to be stopped occasionally.

EXAMPLE 2

A heat shrinkable film was obtained in the same procedures as those in Example 1 except for using an ethylene-propylene random copolymer having an ethylene content of 7 mol %, instead of the ethylene-propylene-butene random copolymer. The thus obtained film was suitable in view of the tensile elongation at breaking, tensile break strength and tensile modulus of elasticity as the film for use in the automatic L-shaped melting-cutting packaging and it was also excellent in the heat shrinkability at low temperature.

What is claimed is:

1. A process for preparing a heat shrinkable film, comprising the steps of:
   a) wet heating a polypropylene heat shrinkable film;
   b) simultaneously biaxially stretching said polypropylene heat shrinkable film at the stretching ratio of from 2.0 to 3.5 times in each of the machine direction and the transverse direction;
   wherein said polypropylene heat shrinkable film comprises at least one of an ethylene-propylene random copolymer and an ethylene-propylene-butene random copolymer, and a propylene-butene copolymer of low crystallinity, and
   wherein the tensile elongation at break of said film is more than 200%, and a heat shrinking ratio of said film is more than 8% in each of the machine direction and the transverse direction when said film is immersed in glycerine at 80° C. in 30 seconds.

2. The process of claim 1, wherein the tensile modulus of elasticity of said polypropylene heat shrinkable film is less than 95 kg/mm².

3. The process of claim 1, wherein the ethylene content in said ethylene-propylene random copolymer is from 1 to 20 mol %, the ethylene content in said ethylene-propylene-butene random copolymer is from 0.5 to 10 mol %, the butene content in said ethylene-propylene-butene random copolymer is from 0.5 to 10 mol %, the propylene content in said polypropylene-butene copolymer of low crystallinity is from 40 to 98 mol % and the butene content in said propylene-butene copolymer of low crystallinity is from 60 to 2 mol %.

4. The process of claim 1, wherein the propylene-butene copolymer of low crystallinity is present at the ratio of 1 to 95 parts by weight based on 100 parts by weight of at least one of the ethylene-propylene random copolymer and the ethylene-propylene-butene random copolymer.

5. The process of claim 1, wherein said polypropylene heat shrinkable film in said simultaneously biaxially stretching step is in a tubular state.

6. The process of claim 5, wherein the tensile modulus of elasticity of said polypropylene heat shrinkable film is less than 95 kg/mm².

7. The process of claim 5, wherein the ethylene content in said ethylene-propylene random copolymer is from 1 to 20 mol %, the ethylene content in said ethylene-propylene-butene random copolymer is from 0.5 to 10 mol %, the butene content in said ethylene-propylene-butene random copolymer is from 0.5 to 10 mol %, the propylene content in said propylene-butene copolymer of low crystallinity is from 40 to 98 mole and the butene content in said propylene-butene copolymer of low crystallinity is from 60 to 2 mol %.

8. The process of claim 5, wherein said propylene-butene copolymer of low crystallinity is mixed at a ratio of 1 to 95 parts by weight based on 100 parts by weight of at least one of the ethylene-propylene random copolymer and the ethylene-propylene-butene random copolymer.

9. The process of claim 3, wherein the ethylene content in the ethylene-propylene random copolymer is from 1 to 20 mol %, the ethylene content in said ethylene-propylene-butene random copolymer is from 0.5 to 10 mol %, the butene content in said ethylene-propylene-butene random copolymer is from 0.5 to 10 mol %, the propylene content in said propylene-butene copolymer of low crystallinity is from 40 to 98 mole and the butene content in said propylene-butene copolymer of low crystallinity is from 20 to 2 mol %.

10. The process of claim 3, wherein the propylene-butene copolymer of low crystallinity is mixed at a ratio of 1 to 95 parts by weight based on 100 parts by weight of at least one of the ethylene-propylene random copolymer and the ethylene-propylene-butene random copolymer.

11. A process for packaging an article, comprising folding said article in a heat shrinkable film, sealing and melt-cutting said film by an automatic L-bar sealer, wherein said heat shrinkable film is a polypropylene heat shrinkable film consisting essentially of at least one of an ethylene-propylene random copolymer and an ethylene-propylene-butene random copolymer, and a propylene-butene copolymer of low crystallinity, said heat shrinkable film resulting from simultaneous biaxial stretching at a stretching ratio of from 2.0 to 3.5 times in each of the machine direction and the transverse direction under wet heating wherein the tensile elongation at breaking of the film is more than 200%, and a heat shrinking ratio of the film is more than 8% in each of the machine direction and the transverse direction when the film is immersed in glycerine at 80° C. for 30 seconds.

12. A process for packaging an article, comprising folding said article in a heat shrinkable film, sealing and melt-cutting said film by an automatic L-bar sealer, wherein said heat shrinkable film is a polypropylene heat shrinkable film prepared by a process comprising the steps of:
   a) wet heating a polypropylene heat shrinkable film;
   b) simultaneously biaxially stretching said polypropylene heat shrinkable film at the stretching ratio of from 2.0 to 3.5 times in each of the machine direction and the transverse direction;
   wherein said polypropylene heat shrinkable film comprises at least one of an ethylene-propylene random copolymer and an ethylene-propylene-butene random copolymer, and a propylene-butene copolymer of low crystallinity, and
   wherein the tensile elongation at break of said film is more than 200%, and a heat shrinking ratio of said film is more than 8% in each of the machine direction and the transverse direction when said film is immersed in glycerine at 80° C. in 30 seconds.

* * * * *